US008922783B2

(12) United States Patent
Bodkin

(10) Patent No.: US 8,922,783 B2
(45) Date of Patent: Dec. 30, 2014

(54) MULTIBAND SPATIAL HETERODYNE SPECTROMETER AND ASSOCIATED METHODS

(75) Inventor: Andrew Bodkin, Wellesley, MA (US)

(73) Assignee: Bodkin Design and Engineering LLC, Newton, MA (US)

( * ) Notice: Subject to any disclaimer, the term of this patent is extended or adjusted under 35 U.S.C. 154(b) by 86 days.

(21) Appl. No.: 13/442,574

(22) Filed: Apr. 9, 2012

(65) Prior Publication Data
US 2014/0029004 A1    Jan. 30, 2014

Related U.S. Application Data

(63) Continuation-in-part of application No. 12/111,108, filed on Apr. 28, 2008, now Pat. No. 8,154,732.

(60) Provisional application No. 60/914,618, filed on Apr. 27, 2007.

(51) Int. Cl.
| | | |
|---|---|---|
| G01B 9/02 | (2006.01) | |
| G01J 3/45 | (2006.01) | |
| G01J 3/453 | (2006.01) | |
| G01J 3/28 | (2006.01) | |
| G01J 3/36 | (2006.01) | |
| G01J 3/02 | (2006.01) | |
| G01J 3/22 | (2006.01) | |

(52) U.S. Cl.
CPC .. *G01J 3/45* (2013.01); *G01J 3/453* (2013.01); *G01J 3/2823* (2013.01); *G01J 3/36* (2013.01); *G01J 3/021* (2013.01); *G01J 3/02* (2013.01); *G01J 3/22* (2013.01)
USPC .......................................... 356/484; 356/451

(58) Field of Classification Search
CPC ........... G01B 9/02007; G01B 9/02015; G01B 9/02016; G01B 2290/20; G01J 3/02; G01J 3/021; G01J 3/22; G01J 3/2823; G01J 3/45; G01J 3/453; G02B 5/18; G02B 5/1861

USPC ................. 356/328, 451, 456, 484, 488, 521; 359/566, 569, 571
See application file for complete search history.

(56) References Cited

U.S. PATENT DOCUMENTS

| | | |
|---|---|---|
| 3,698,812 A | 10/1972 | Nelson |
| 4,175,844 A | 11/1979 | Glaser-Inbari |

(Continued)

OTHER PUBLICATIONS

Milligan, Scott et al. "Optical design of an imaging spatial heterodyne infrared spectrometer". Part of the SPIE Conference on Infrared Technology and Applications XXV, SPIE vol. 3698, Apr. 1999, pp. 869-881.

(Continued)

*Primary Examiner* — Michael A Lyons
(74) *Attorney, Agent, or Firm* — Lathrop & Gage LLP

(57) ABSTRACT

A multiband spatial heterodyne spectrometer for determining spectra in first and second wavelength bands has a beamsplitter configured to split incident light and to direct the incident light upon a first and a second diffraction grating. The gratings are configured for Littrow reflection of incident light of the first wavelength band at a first order and Littrow reflection of incident light of the second wavelength band at a second order. Light reflected by the first and the second diffraction grating forms diffraction patterns imaged by an electronic camera. A dispersive device separates the imaged interference patterns onto separate groups of pixel sensors corresponding to the wavelength bands. A processing device receives information from the detector and computes spectra therefrom. The second diffraction grating is split spatially or temporally to provide two different responses, so the system can disambiguate spectra. In embodiments, the spectrometer computes hyperspectral images of a target.

14 Claims, 15 Drawing Sheets

(56) References Cited

U.S. PATENT DOCUMENTS

| | | | |
|---|---|---|---|
| 4,561,775 | A | 12/1985 | Patrick et al. |
| 4,708,420 | A | 11/1987 | Liddiard |
| 4,754,139 | A | 6/1988 | Ennulat et al. |
| 5,136,312 | A | 8/1992 | Weaver et al. |
| 5,191,469 | A | 3/1993 | Margolis |
| 5,239,179 | A | 8/1993 | Baker |
| 5,583,340 | A | 12/1996 | Grossman |
| 5,763,882 | A | 6/1998 | Klapper et al. |
| 5,825,029 | A | 10/1998 | Agnese et al. |
| 5,841,574 | A | 11/1998 | Willey |
| 5,877,500 | A | 3/1999 | Braig et al. |
| 6,067,197 | A * | 5/2000 | Blasiak et al. ............... 359/571 |
| 6,362,872 | B1 | 3/2002 | Berdanier |
| 6,549,828 | B1 | 4/2003 | Garrot, Jr. et al. |
| 6,665,116 | B1 | 12/2003 | Harvey et al. |
| 6,781,127 | B1 | 8/2004 | Wolff et al. |
| 7,242,478 | B1 | 7/2007 | Dombrowski et al. |
| 7,456,957 | B2 | 11/2008 | Everett et al. |
| 7,619,820 | B2 * | 11/2009 | Lee ............... 359/575 |
| 8,154,732 | B2 * | 4/2012 | Bodkin et al. ............... 356/484 |
| 2001/0045516 | A1 | 11/2001 | Emanuel et al. |
| 2002/0180866 | A1 | 12/2002 | Monroe |
| 2003/0016448 | A1 * | 1/2003 | Takasuka et al. ............ 359/569 |
| 2004/0090623 | A1 | 5/2004 | Richman |
| 2004/0119020 | A1 | 6/2004 | Bodkin |
| 2004/0238724 | A1 | 12/2004 | Moody et al. |
| 2005/0023445 | A1 | 2/2005 | Horn et al. |
| 2006/0208193 | A1 | 9/2006 | Bodkin |
| 2008/0088840 | A1 | 4/2008 | Bodkin et al. |
| 2009/0051899 | A1 * | 2/2009 | Harlander et al. ............ 356/51 |
| 2011/0279817 | A1 * | 11/2011 | Amako et al. ............... 356/301 |

OTHER PUBLICATIONS

Powell, Ian et al. "Performance Comparison of an Anamorphic Spatial Heterodyne Spectrometer with Conventional Spectrometer". International Optical Design Conference, Jun. 4, 2006, pp. 1-3.

Sheinis, A.I. et al., "Integral Field Unit for the Echellete Spectrograph and Imager at Keck II", 4841 Proc. of SPIE, 1078-85 (2003).

Bacon R., et al., "3D Spectrography at High Spatial Resolution", 113 Astron. Astrophys. Suppl. Ser. 347-57 (1995).

Goetz, A.F.H. et al., Imaging Spectrometry for Earth Remote Sensing, Science, New Series, vol. 228, No. 4704 (Jun. 7, 1985), pp. 1147.

Content, R., "New Design for Integral Field Spectroscopy with 8-m Telescopes", 2871 Proc. of SPIE 1295-1305 (1997).

Martini et al., "Geological and geo-botanical characterization of a hydrothermal system using hyperspectral imagery analysis", 1 Proc. of the Thirteenth International Conference, Applied Geologic Remote Sensing, 337-341 (1999).

Sheinis,a.I.. et al., "Esi, a new Keck Observatory echellette spectrograph and imager", 114 Pub. of Astronomical Society of the Pacific, 851-865 (2002).

Bach, "Atmospheric Correction of Hyperspectral Data in Terms of the Determination of Plant Parameters", 2318 Proc. of SPIE, 52, 1994.

Esplin et al., "SABER Instrument Design Update", 2553 Proc. of SPIE, 253-63 (1995).

Cayla et al., "IASA Instrument Overview", 2553 Proc. of SPIE, 316-328 (1995).

Kailey. W.F., et al., "Use of Hyperspectral Imagery for Broad-Area Detection of Small Targets", 2819 Proc, of SPIE, 15-23 (1996).

Willoughby, C.T. et al., "Application of Hyperspectral Imaging Spectrometer Systems to Industrial Inspection", 2599 Proc. of SPIE, 264, 1996.

Eismann, M.T. et al, "Target Detection in Desert Backgrounds", 2561 Proc. of SPIE, 80, 1995.

Bacon et al., "The Integral Field Spectrograph Tiger", 1988 vltt. Conf. 1185B.

Murguia, J.E. et al., "A Compact Visible/Near-infrared Hyperspectral Imager", 4028 Proc SPIE 457-468 (2000).

Ewing, B. et al. "Spectrometer Performance Comparison for the Characterization of Transient Events", obtained from link on Internet archive dated Oct. 18, 2003, 8 pages.

Opto-Knowledge Systems, Inc. (2003) Website, http://www.techexpo.com/WWW/opto-knowledge/projmwlw4d-is.html; obtained from internet archive dated Aug. 5, 2004, 2 pages.

Vanderriest, C. et al., "Astronomical uses of integral field spectrography: present applications at CFHT and future developments", 2198 SPIE 1376-1384 (1994).

Xing, Y. et al., "Hyperspectral Image Analysis using ENVI", 4383 Proc SPIE 79-86 (2001).

Sheinis et al., "Performance Characteristics of the new Keck Observatory echelle spectrograph and imager", 4008 Proc. SPIE, 522-533 (2000).

Fransden et al. "An Astronomical Seismometer", 279 Astron. Astrophys. 310-321 (1993).

Select file history from related U.S. Appl. No. 13/442,574, date Feb. 23, 2011 to Dec. 2, 2011, 65 pages.

* cited by examiner

MULTIBAND SPATIAL HETERODYNE SPECTROMETER AND ASSOCIATED METHODS

RELATED APPLICATIONS

This application is a continuation in part of U.S. patent application Ser. No. 12/111,108, filed 28 Apr. 2008 now U.S. Pat. No. 8,154,732, which in turn claims priority to U.S. Provisional Patent Application Ser. No. 60/914,618, filed Apr. 27, 2007. The contents of both applications are incorporated by reference herein.

U.S. GOVERNMENT RIGHTS

This invention was made with Government support under Contract No. HQ0006-07-C-7606 awarded by the Missile Defense Agency of the Department of Defense. The Government has certain rights in this invention.

BACKGROUND

Spatial Heterodyne Spectrometers incorporate division of the electromagnetic spectrum into many separate wavelength bands, which may be located in the infrared, visible, or ultraviolet regions. Spectra are obtained that is useful in a number of fields. In particular, each wavelength band may carry different or additional information. This high-resolution spectral information, in combination with the spatial information, is suitable for identification of chemical species, and for identification of objects by their chemical makeup. The high-resolution spectra may further be used in hyperspectral imaging applications.

Some chemical targets have telltale spectral feature that require very high-resolution spectroscopy to identify, and with spectral peaks located octaves apart in wavelength. Typically, these spectra are measured with a Fourier transform infrared spectrometer (FTIR). However, this scanning device takes minutes to gather the data. Slit spectrometer can be used for this purpose but their throughput is low, they can be very large, and their spectral coverage is limited to a single octave.

Spatial Heterodyne Spectrometers (SHS) are typically spectrometers capable of observing spectra of light radiated from or reflected by a target in a narrow band of wavelengths.

SUMMARY

A multiband spatial heterodyne spectrometer for determining spectra in first and second wavelength bands has a beam splitter configured to split incident light and to direct the incident light upon a first and a second diffraction grating. The gratings are configured for Littrow reflection of incident light of the first wavelength band at a first order and Littrow reflection of incident light of the second wavelength band at a second order. Light reflected by the first and the second diffraction grating forms diffraction patterns that are imaged by an electronic camera. A dispersive device such as a prism or diffraction grating separates the imaged interference patterns onto separate groups of pixel sensors corresponding to the wavelength bands. A processing device receives information from the detector and computes spectra therefrom. The second diffraction grating is split spatially or temporally to provide two different responses, so the system can disambiguate spectra. In embodiments, the spectrometer is configured to compute hyperspectral images of a target.

In an embodiment, a multiband dual-path spatial heterodyne spectrometer for determining spectra of incident light has a beam splitter that divides incident light to illuminate a first and a second diffraction grating. The first diffraction grating has a first half configured for Littrow reflection of incident light at a first wavelength at a first angle, and a second half configured for Littrow reflection of incident light at the first wavelength at a second angle, the first and second angle differing. The second diffraction grating is configured for Littrow reflection of light of the first wavelength and light reflected by the first and the second diffraction gratings forms interference patterns. An electronic camera is provided for imaging the interference patterns, the camera having a detector with at least a first and a second group of pixel sensors; and a processing device receives information from the detector to compute spectra therefrom.

In an alternative embodiment, a temporally dual-path multiband spatial heterodyne spectrometer for determining spectra of incident light has a beam splitter for directing the incident light upon a first and a second diffraction grating, wherein the first diffraction grating is configured for Littrow reflection of incident light at a first wavelength at a first angle, wherein the second diffraction grating is configured for Littrow reflection of light of the first wavelength, and wherein light reflected by the first and the second diffraction grating forms interference patterns. The second diffraction grating has a first mode wherein Littrow reflection of light of the first wavelength band is at the first angle, and a second mode wherein Littrow reflection of light of the first wavelength band is at a second angle, and alternates between the first mode and the second mode. An electronic camera images the interference patterns, the camera having a detector having at least a first and a second group of pixel sensors; and a processing device receives information from the detector and computes spectra therefrom.

DETAILED DESCRIPTION OF INVENTION

An improvement in spectrometers and imaging is the Spatial Heterodyne Spectrometer disclosed herein, (SHS) that can provide very high resolution in a very small package, and can measure spectra in a fraction of a second over a wide bandwidth. The SHS offers very high resolution over a small spectral range. The innovation shown here allows the SHS to operate over a much larger spectral range than with prior instruments, spanning multiple octaves. This device is the Multiband Spatial Heterodyne Spectrometer (MSHS). This new device can seek for many more telltale signature peaks than prior instruments, greatly increasing the likely hood of accurate chemical identification. Such a spectrometer has been adapted to hyperspectral imaging.

Figure 1:
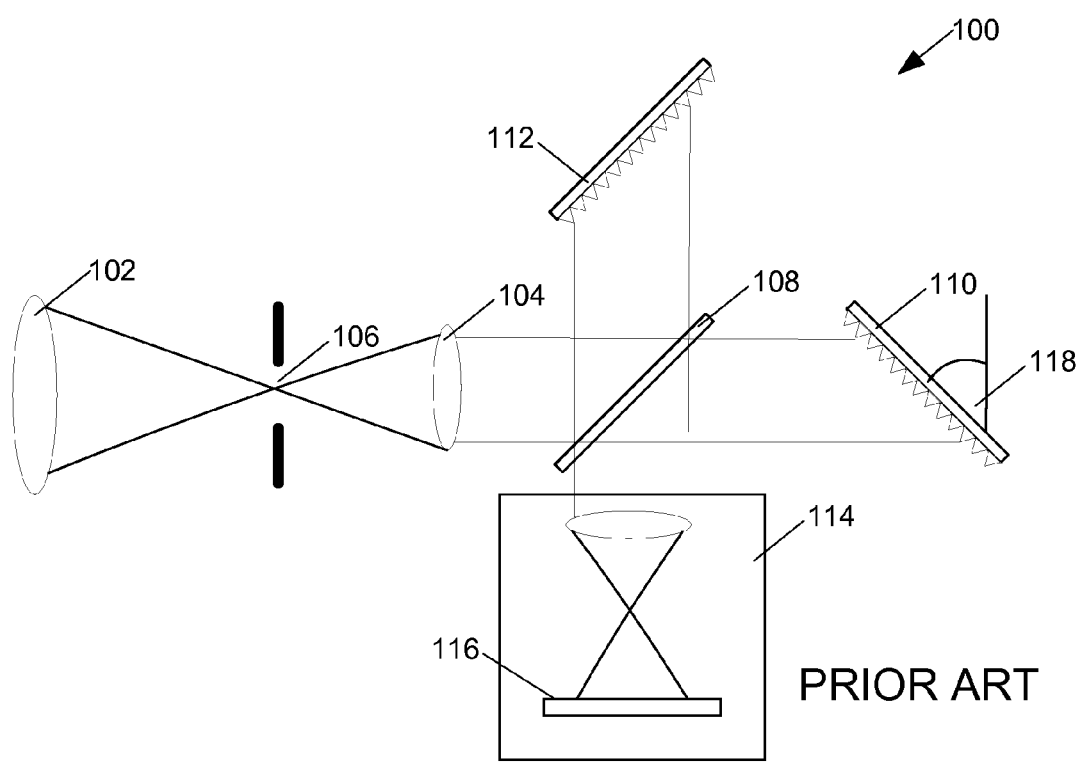
FIG. 1 is a block diagram of a spatial heterodyne spectrometer as known in the art.

A prior art spatial heterodyne spectrometer 100 (SHS) is illustrated in FIG. 1. In spectrometer 100, light enters through a lens 102, 104 and aperture 106 system. The light impinges upon a beam splitter 108. A portion of the light passes through beam splitter 108 and is reflected and dispersed by a first diffraction grating 110. A second portion of the light is reflected by beam splitter 108 and is reflected by a second diffraction grating 112. A portion of light from the first diffraction grating 110 is reflected by the beam splitter 108 through an interference zone into a camera 114. A portion of light from the second diffraction grating 112 passes through beam splitter 108 through the interference zone into the electronic camera 114. Since the light from first grating 110 and second grating 112 have differing wavefront angles, and these wavefront angles vary with wavelength because of wavelength-dependent diffraction by the gratings 110, 112, an interference pattern is created in the interference zone. Camera 114 provides an image of this interference pattern on a detector 116 having a linear array of pixel sensors, a transform of this pattern may be performed by a digital signal processor to provide a spectrum of light near a diffraction-grating-pitch-and-angle-dependent center wavelength. In spectrometer 100, detector 116 may be a two-dimensional detector array, but this does not significantly broaden bandwidth.

The spectrometer of FIG. 1 tends to have a narrow bandwidth centered upon a wavelength where Littrow diffraction occurs—the wavelength, dependent upon the pitch of the grating 110 and the angle 118 at which the grating is set where incident light is reflected in the direction from which it came. The bandwidth and resolution of the instrument is also limited in part by resolution of the camera 114.

Light diffracted by a diffraction grating typically gives multiple spectra; each spectrum of the spectra is known by an order number, where zero-order represents undiffracted light, a first order is that closest in angle to undiffracted light, second order is the next spectrum beyond first order, etc. It is known that high order spectra may overlap—for example but not limitation the same diffraction angle may result with a first wavelength diffracted sixth order and a second wavelength diffracted fifth order.

Embodiments herein described improve on the spatial heterodyne spectrometer ("SHS") of FIG. 1 by increasing spectral coverage; these embodiments are multiband spatial heterodyne spectrometers (MSHS). Embodiments herein also function as imaging spectrometers.

Figure 2:
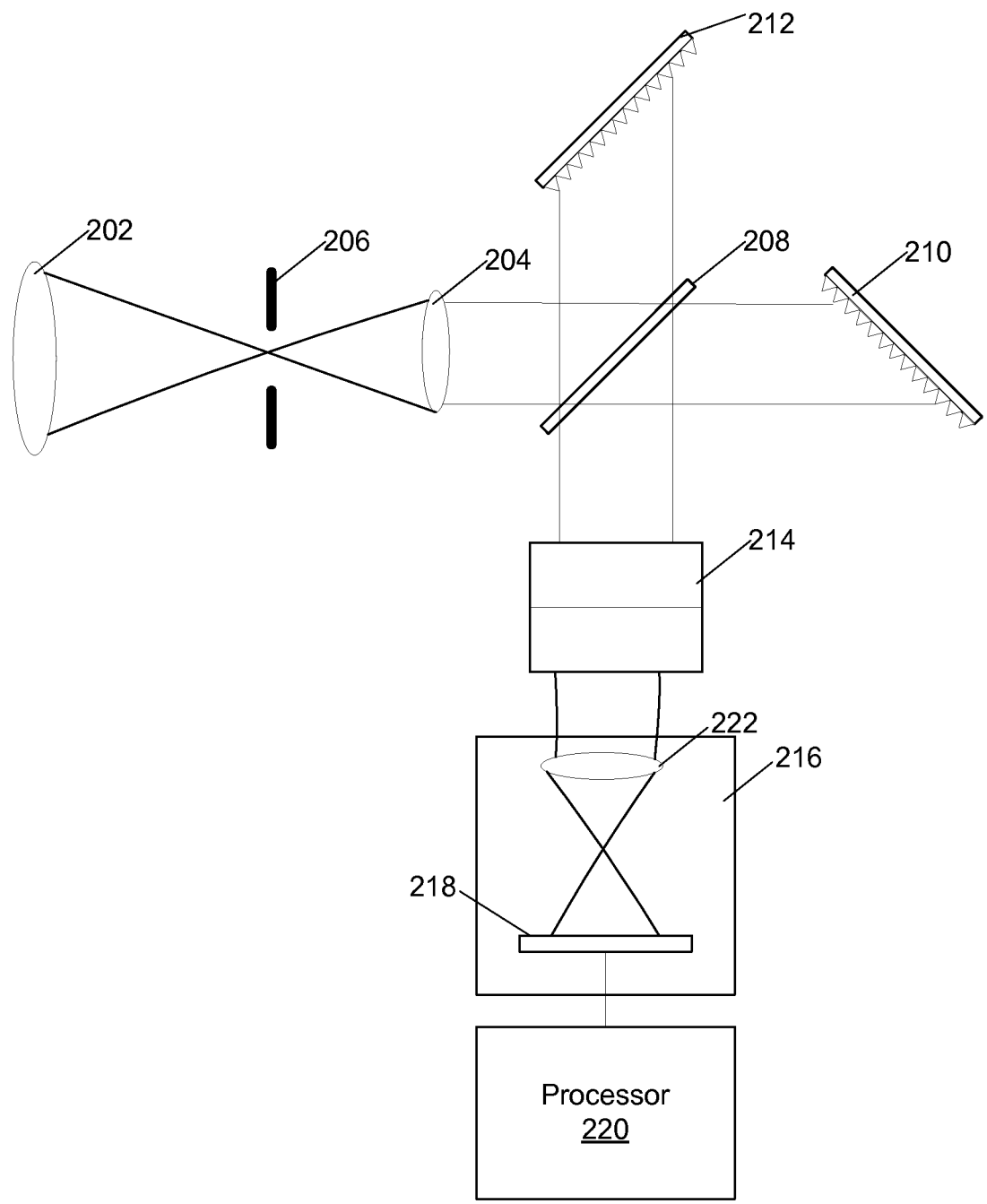
FIG. 2 is a block diagram of a multiband spatial heterodyne spectrometer viewed in a first axis.
Figure 3:
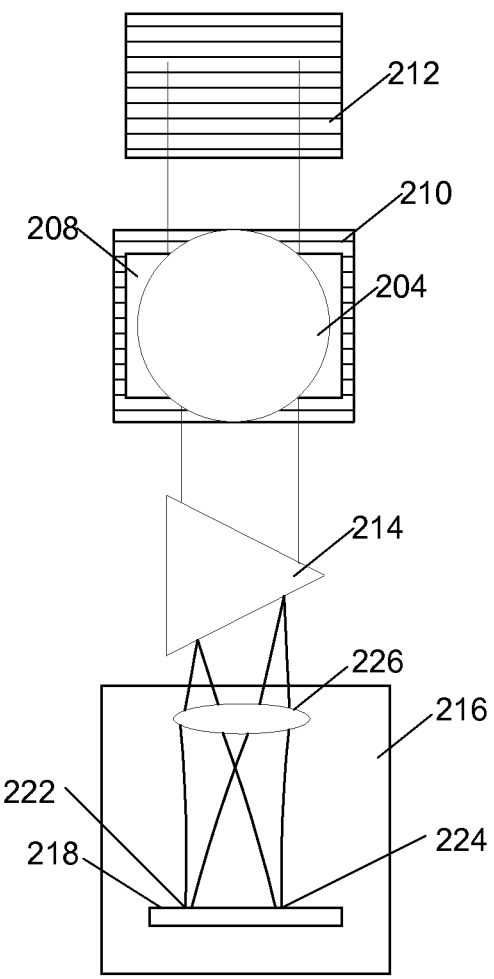
FIG. 3 is a block diagram of the multiband spatial heterodyne spectrometer of FIG. 2 but rotated 90 degrees with respect to FIG. 2.
Figure 4:
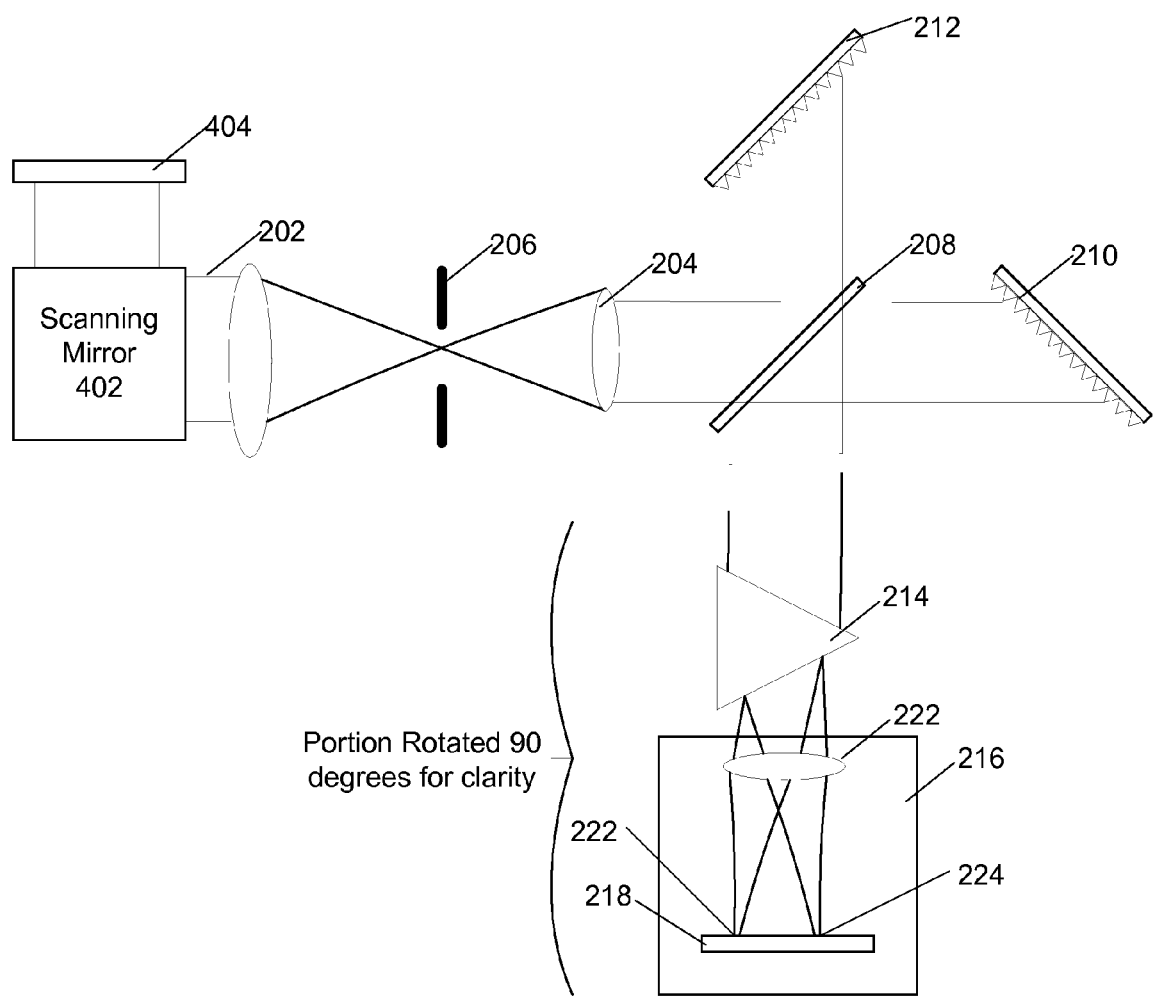
FIG. 4 is a block diagram of an imaging multiband spatial heterodyne spectrometer.

In an embodiment of the MSHS, as illustrated in FIGS. 2, 3, and 4, light enters through a focusing and aperture system that may have focusing elements such as lenses 202, 204 and an aperture 206, or may use mirrors as focusing elements (not shown). Mirrors are particularly useful in very high bandwidth embodiments because they are not as wavelength-dependent as lenses.

The light impinges upon a beam splitter 208. A portion of the light passes through beam splitter 208 and is reflected by a first diffraction grating 210. A second portion of the light is reflected by beam splitter 208 and is reflected by a second diffraction grating 212. A portion of light from the first diffraction grating 210 is reflected by the beam splitter 208 and thence into a prism 214, a cylinder lens, a spherical lens and thence into an electronic camera 216.

A portion of light from the second diffraction grating 212 passes through beam splitter 208 through the prism 214 into the electronic camera 216. Since the light from first grating 210 and second grating 212 have differing wavefront angles, and these wavefront angles vary with wavelength because of wavelength-dependent diffraction by the gratings 210, 212, interference patterns form in the interference zone. Camera 216 provides an image of the interference patterns on a detector 218 having either multiple linear arrays of pixel sensors or, in a preferred embodiment, a two dimensional array of pixel sensors.

The MSHS of FIGS. 2 and 3 has diffraction gratings 210, 212 such that of a first band of interest is returned by those gratings to the beam splitter 208 when diffracted through a first order N (where N is typically not one), and that a second band of interest is returned by those gratings 210, 212 to the beam splitter 208 when diffracted according through a second order N+M, where M is an integer. Light in each of these bands forms an essentially separate diffraction pattern, light in the first band forming a first pattern, light in the second band forming a second pattern. The MSHS may be configured such that light in additional bands of interest is also returned to beam splitter 208 when diffracted according to different orders, light of each order forming a diffraction pattern.

In a particular embodiment, the first order N is in the range 10 to 200, in another embodiment N is in the range 20 to 400.

Each band of interest has a center wavelength for Littrow refraction given by the grating equation $2\sigma \sin \theta_L = n/d$ (1) where $\theta_L$ is the angle the gratings are inclined to the optical axis, n is the grating order and $1/d$ is the grating groove density.

Figure 5:
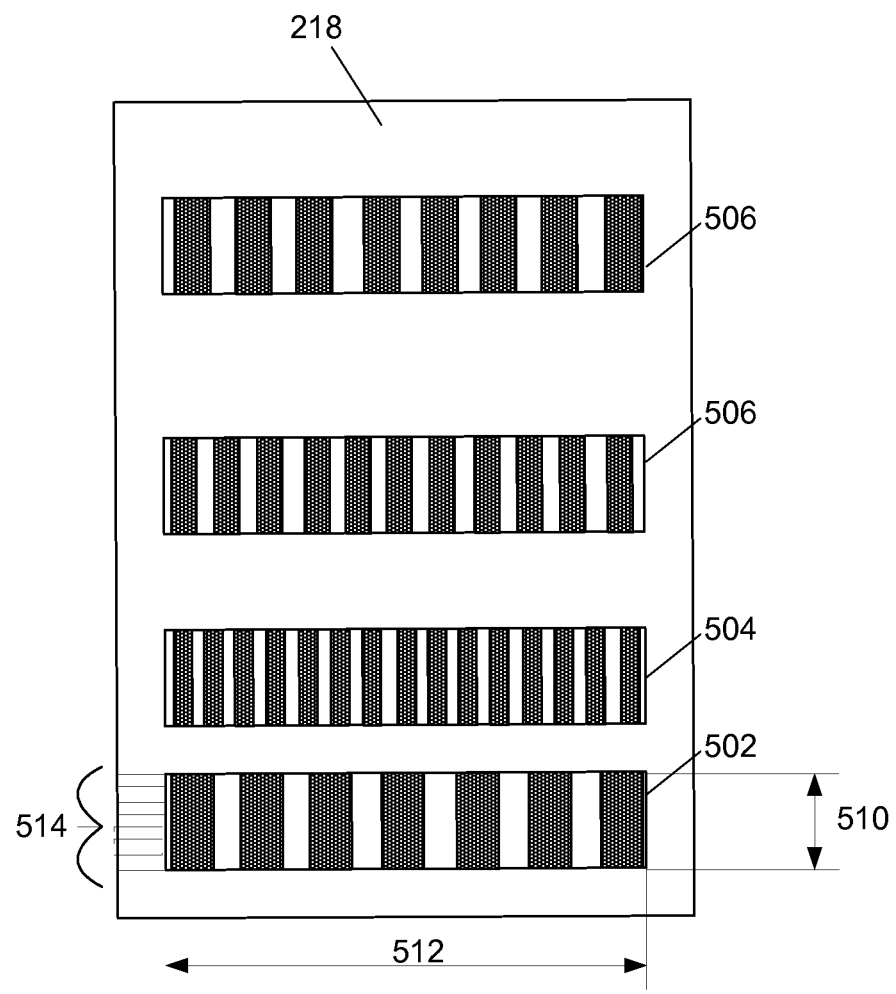
FIG. 5 illustrates multiple spectra corresponding to different bands projected on a detector of the spectrometer of FIG. 2.

One or more prisms 214 are configured at right angles to the first and second interference patterns, to disambiguate these patterns by separating them according to wavelength—without prism 214 the patterns overlap on the detector 218. In consequence, the first pattern from the first band is imaged 502 (FIG. 5) by electronic camera 216 on a first row 222 of pixel sensors of detector 218 and the second pattern is imaged 504 by electronic camera 216 on a second row 224 of pixel sensors of detector 218; in an embodiment detector 218 has a two dimensional array of pixel sensors. In an embodiment, camera 216 has at least one focusing element 226 such as a lens or concave mirror. In a particular embodiment, focusing element 226 may be an anamorphic lens or may incorporate both spherical and cylindrical lenses Additional spectra 506 corresponding to additional bands may also be imaged on, and detected by, the detector 218.

In an alternative embodiment, an additional diffraction grating is used for disambiguation in place of prism 214. Similarly, rows and columns of pixel sensors of the detector 218 may be interchanged such that the first pattern is imaged by a first column of pixel sensors of detector 218 instead of a first row—what is expected is that a first group of individual pixel sensors in a first region of detector 218 receive the first pattern and a second group in a second region of detector 218 receive the second pattern, and that the first and second group are distinct and nonoverlapping. For simplicity, a linear arrangement of pixel sensors exposed to a diffraction pattern is referred to as a row of pixel sensors. Pixel sensors of detector 218 may be fabricated from Indium Gallium Arsenide, Silicon, or of such other semiconductor materials as are used in the ultraviolet, visible light, and infrared imaging art. Detector 218 may be a composite detector having rows of pixel sensors of differing types. For example, a row of Mercury Cadmium Telluride (MCT) sensors may be parallel to a row of silicon PIN sensors to provide appropriate sensitivity for detecting spectra imaged on each row of sensors.

Digital processor 220 is configured to receive data from the first and second groups of pixel sensors of detector 218, and transforms each of these patterns to provide a spectrum of light in each of the first and second band of wavelengths.

While the spectrometer of FIG. 2 may be operated to analyze spectra from point or slit sources, in a particular embodiment, the spectrometer of FIG. 4 is coupled to receive light from scanning mirrors 402 adapted to scan a field of view through a window 404. In this embodiment, the processor 220 constructs hyperspectral images based upon the spectra determined from the interference patterns; this embodiment operates as an imaging spectrometer.

The multiband spatial heterodyne spectrometer ("MSHS") of FIG. 2 therefore utilizes low spatial frequency, high order gratings in the spectrometer path, and utilizes a prism to eliminate order mixing. The multiband spatial heterodyne spectrometer may also be called a multiple order spatial heterodyne spectrometer.

A particular embodiment of the MSHS images a slit plane in one of two orthogonal axes, and the gratings in the other axis using anamorphic lenses in camera 216 instead of the spherical lenses typically used in SHS spectrometers; these lenses may be cylindrical lenses, may be a combination of spherical and cylindrical lenses, or may be lenses ground or molded to have both spherical and cylindrical properties.

A cylindrical lens focuses light from the slit in one orthogonal direction only. This means that, in that embodiment, a series of interferograms associated with different positions within the slit as well as interferograms associated with different orders are projected upon detector 218. The interferogram associated with each order has finite spatial extent perpendicular to the spread of fringes (Fourier direction) 512. Within each order, this perpendicular direction (spatial direction) 510 (FIG. 5) contains information about different spatial locations along the length of the slit. In an alternative imaging embodiment of the MSHS, the interferogram associated with each order is arranged to fall on multiple rows 514 of pixel sensors of detector 218.

When a device performs a separate one-dimensional Fourier transform on each row of pixel sensors in the interferogram individually, the device retains spatial content in one direction while producing spectral information in the Fourier direction. The device therefore can obtain spectra at several orders for each of several locations across an illuminated slit simultaneously.

In this alternative embodiment, scanning mirror 402 need scan only, for example and not limitation, horizontally while vertical image information is obtained by imaging a full vertical stripe on a vertical slit aperture 206. In other embodiments, scanning mirror 402 scans vertically while a full horizontal stripe of the field of view is imaged on a horizontal slit aperture 206.

An embodiment of the MSHS allows for a narrow free-spectral range of any individual order, while allowing for extended wavelength coverage by imaging multiple orders onto a detector. This helps to minimize system noise, as shot noise is directly proportional to the free spectral range. Free spectral range ("FSR") is the difference between the longest and shortest wavelength passed by any given order, n. The FSR is approximately equal to the central wavelength in the order, lambda, divided by the order number, n. In order to reduce the FSR, the MSHS is configured to operate in a high order (e.g., 30 to 200). This is achieved by providing the MSHS with a pair of echelle gratings in each arm and cross dispersing with a prism, as stated above. Furthermore, multiple orders are imaged simultaneously in order to obtain wide wavelength coverage with the instrument.

It is also possible to couple an MSHS with a tunable spectral filter such as a Fabry-Perot ("FP") etalon to image discrete, non-contiguous regions of spectral space at very high resolution, and with low noise. This would be done by using the FP to pick out small regions of an individual order, to minimize the shot noise due to extraneous radiation from the rest of the order. The FP would set FSR, and the MSHS would set resolution.

Typical prior art SHS devices examine a single region of a spectrum. Our new MSHS allows measurement of multiple discontinuous regions of spectra by independently measuring the interference pattern from two or more grating orders representing two or more separate wavelength bands, as shown in FIG. 1. These regions of spectra may or may not be adjacent. The MSHS includes a post-dispersing cross-dispersing prism after the beam-splitter to separate out on the detector the interference patterns from different orders of the grating corresponding to different bands. In other embodiments, the cross-dispersing prism disperses prior to the SHS assembly.

Data obtained from the herein described MSHS not only have the advantages of hyperspectral imaging, but may be able to identify quantities of particular elements or compounds in absorption or emission spectra of targets. For example, upon impact of a ballistic missile warhead with a kinetic kill projectile, a quantity of hot gas is produced that has emission spectra. An imaging MSHS spectrophotometer is expected to be able to determine constituent elements of the warhead sufficient to distinguish a destroyed warhead from a destroyed decoy by identifying emission and absorption spectra from plutonium and/or uranium ions in the hot gas.

In another embodiment images obtained from the herein described MSHS identify quantities of hydroxyl (OH—) ions in absorption or emission spectra of portions of the atmosphere, thereby remotely measuring humidity.

The imaging MSHS spectrophotometer herein described is capable of imaging occurrence of particular ionic atomic or molecular species in a field of view by recognizing absorption or emission spectra of those species at each of several positions in a stripe, and recording these occurrences as the stripe is swept across the field of view. Each of those positions in a stripe corresponds to pixels in the computed image.

Figure 6:
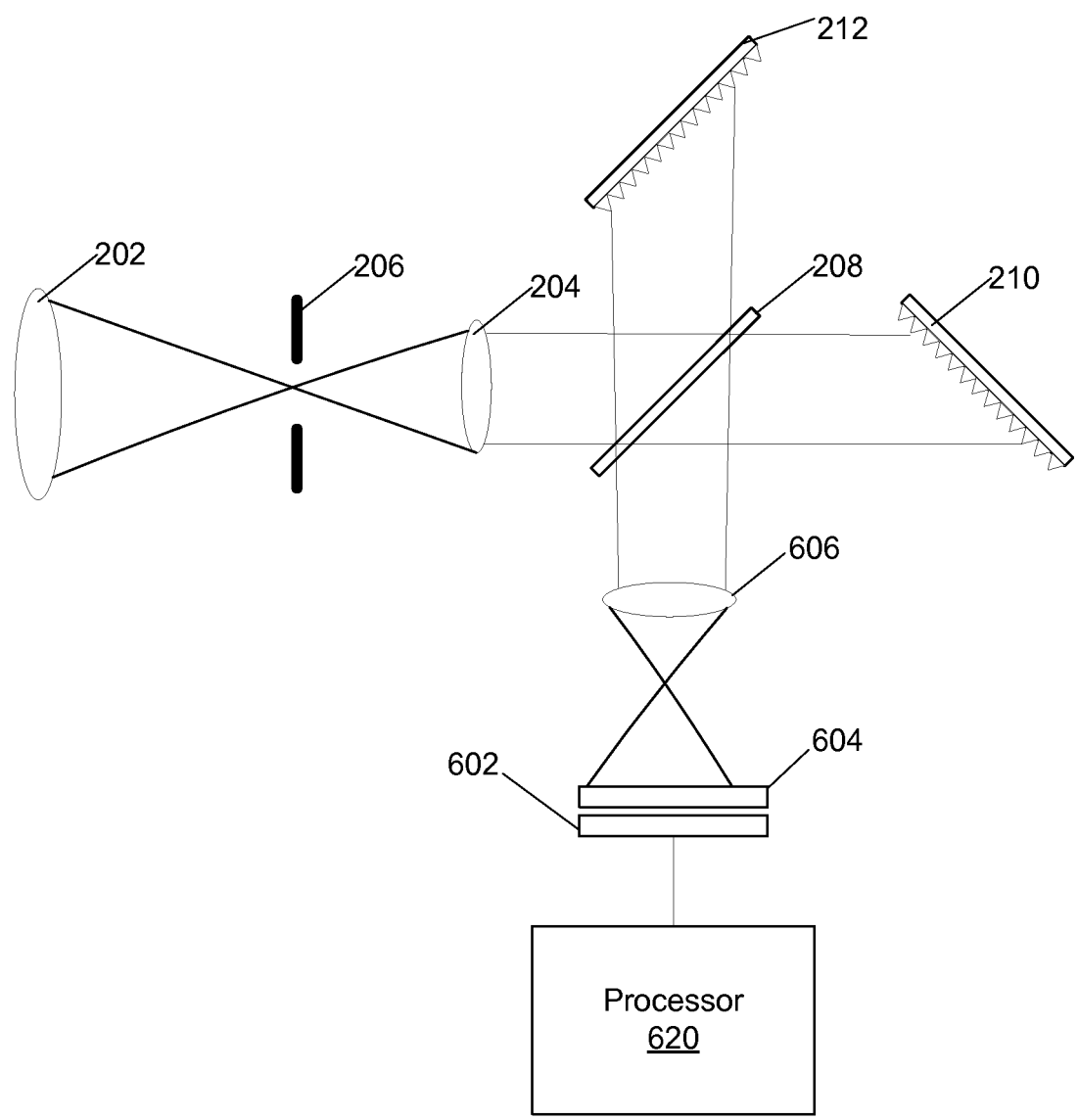
FIG. 6 illustrates an embodiment wherein disambiguation is performed by layering a short-wavelength-sensitive photodetector array upon a long-wavelength-sensitive photodetector array.
Figure 6A:
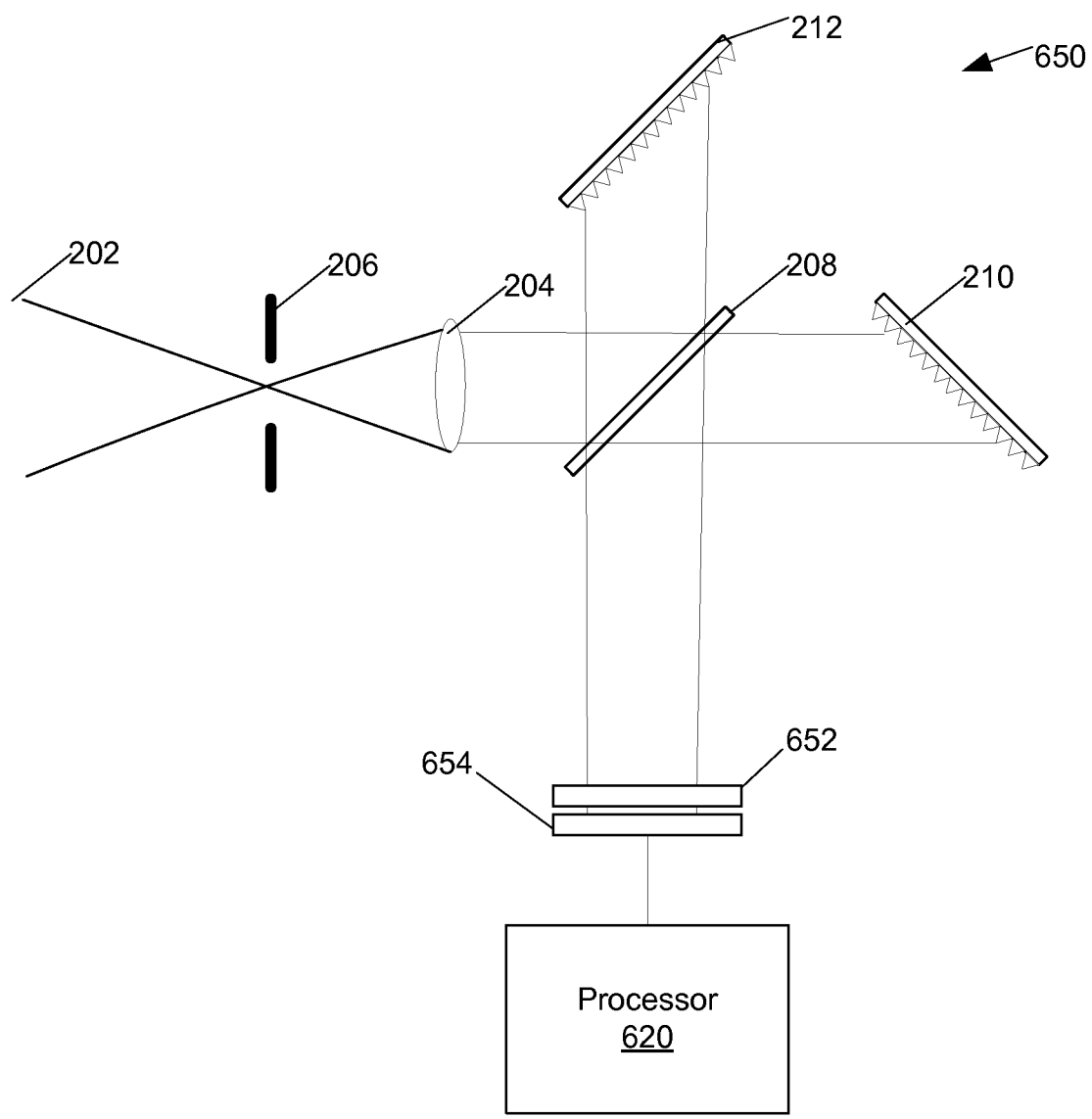
FIG. 6A illustrates an embodiment wherein disambiguation is performed by use of a continuously variable filter.

In an alternative embodiment, as illustrated in FIG. 6, the MSHS has a front end similar to that illustrated in FIGS. 2, 3, and 4; the common portion components are described with reference to FIGS. 2, 3, and 4. Instead of a prism a multilayer photodetector 602, 604 is used. The photodetector has a bottom layer 602 that has an array of pixel sensor elements sensitive in the infrared. Bottom layer 602 is overlain by an upper layer 604 having pixel sensor elements sensitive to shorter wavelengths, such as visible light, and transparent to longer wavelengths such as infrared. Such sensor elements may be fabricated from mercury cadmium telluride MCT or other materials known in the photosensor art.

Anamorphic lens 606 focuses an image of the interference patterns generated in at least a first and a second band upon the pixel sensor elements 602, 604; upper short wavelength sensitive layer 604 responding to the pattern in the first band, and lower long-wavelength-sensitive layer 602 responding to the pattern of the second band. Processor 620 receives images from both sets of pixel sensor elements and processes the images received by pixel sensor element layers 602 and 604 separately. Once the spectra have been determined for each band separately, a composite hyperspectral image may be constructed. The embodiment of FIG. 6 is particularly adapted to imaging spectrometers.

In an alternative embodiment 650, a continuously variable filter 652 is provided in front of image sensor 654, filter 652 is arranged such that a first filter zone that passes light of a first wavelength band is positioned close over a first row of pixel photosensors on image sensor 654, and a second filter zone that passes light of a second wavelength band is positioned over a second row of pixel photosensors on image sensor 654. Processor 650 can therefore disambiguate interference patterns formed by different wavelength bands at different orders of diffraction because each order illuminates a different row of pixel photosensors. A lens system, which may incorporate anamorphic or cylindrical lenses, may be interposed between beamsplitter 208 and filter 652 to magnify fringes for easier viewing.

Figure 7:
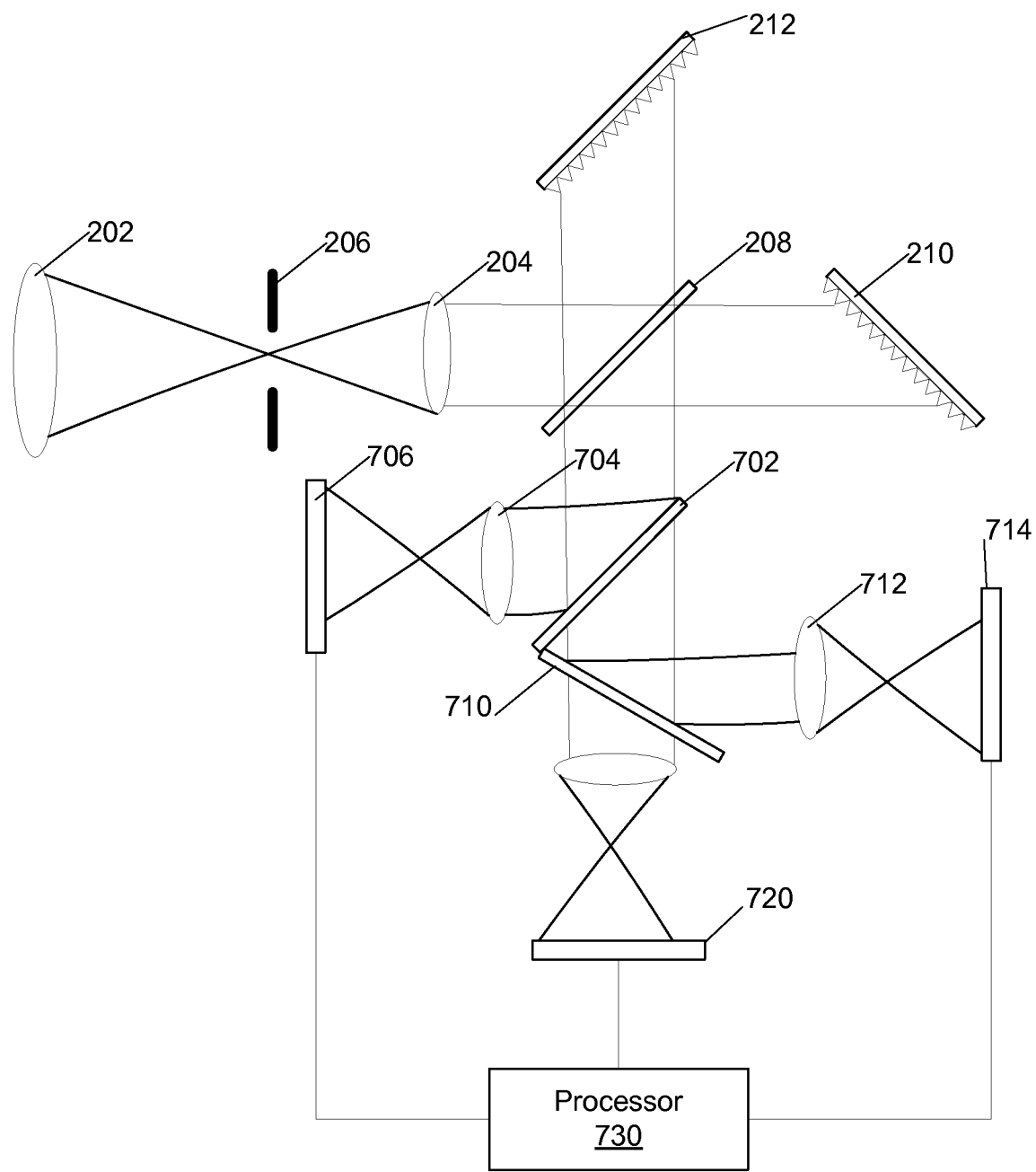
FIG. 7 illustrates an embodiment wherein disambiguation is performed by dichroic filters.

In yet another embodiment, as illustrated in FIG. 7, disambiguation is performed by a series of dichroic filters. In this embodiment, a first dichroic filter 702 is reflective to light of a first band, and transparent to a second and third band. In this embodiment, light of the first band is reflected through lens 704 and the interference pattern for this band is focused on a first photodetector cell array 706. Similarly, second filter 710 filter is transparent to the third band and reflective to the second band, in this embodiment the second band is reflected by filter 710 and focused by lens 712 on second photodetector cell array 714. Light of the third band passes through both filters 710, 702 and is focused on photodetector cell array 720. Information from all three photodetectors 706, 714, 720 is fed to processor 730 for processing as heretofore described.

Figure 8:
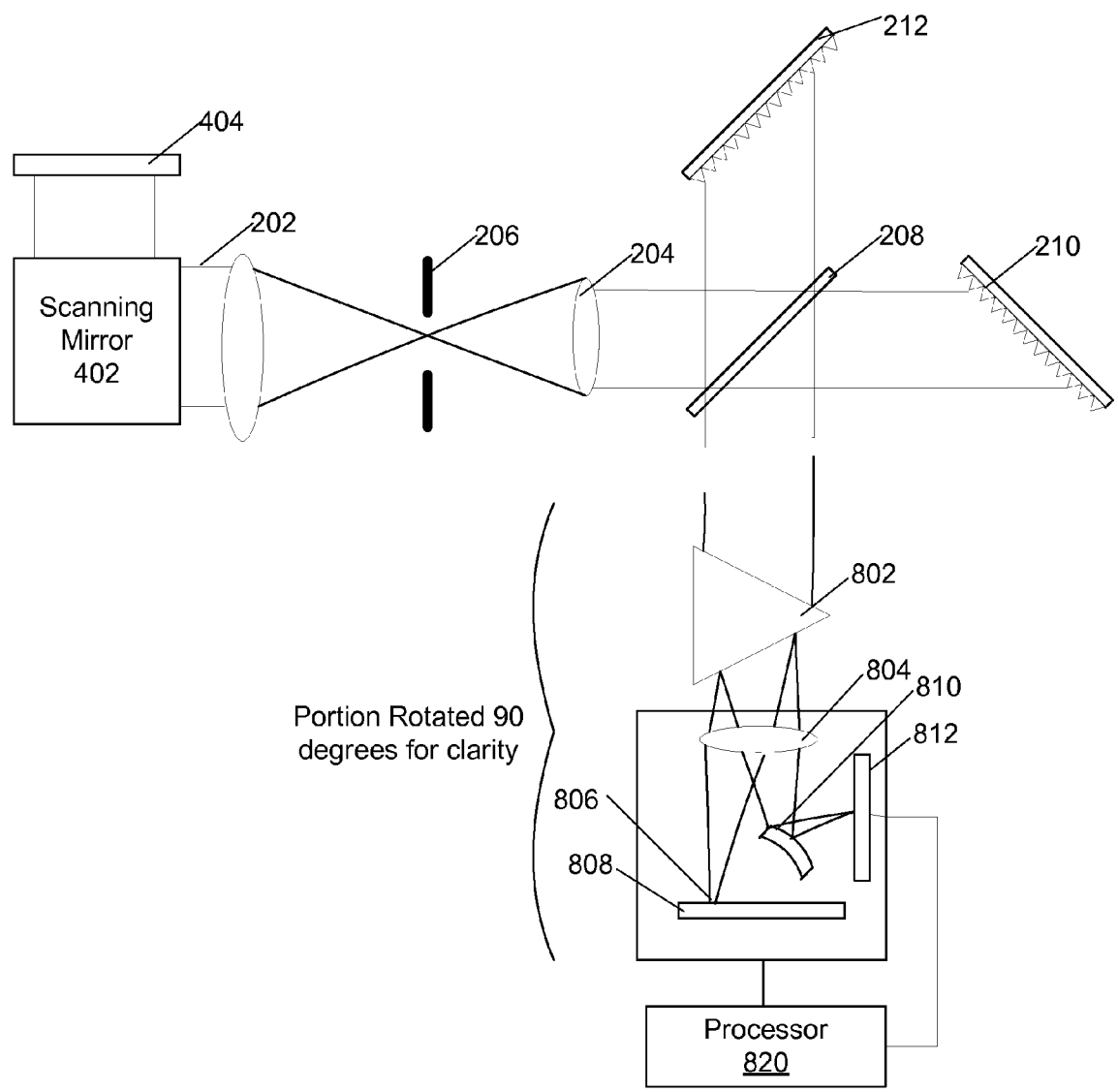
FIG. 8 illustrates an embodiment wherein disambiguation is by a dispersive device, and wherein there are separate detectors for some bands of the instrument.

In yet another embodiment, as illustrated in FIG. 8, disambiguation is performed by a prism 802, and light of wavelength bands are further separated onto detectors of two or more different types, each type suitable for detection of light of particular wavelength bands. Light of a first band, or group of bands, is focused by lens 804 onto a first location 806 of a first detector 808. Light of a second band, or group of bands, is intercepted by mirror 810 and focused on a second detector 812. Mirror 810 may be flat, or may be curved to provide appropriate focus. Information from both detectors 808, 812, is processed by processor 820 to determine spectra in each band.

In the embodiment of FIGS. 2, 3, and 4 as heretofore described, gratings 210 and 212 may be fixed into position; and may be fabricated as a monolithic device. In an alternate embodiment, gratings 210 and 212 are rotatably mounted on mountings that rotate synchronously. In this tunable alternative embodiment, the center wavelengths of the bands are adjustable by rotation of the gratings.

In the embodiment of FIGS. 2, 3, and 4 as heretofore described, gratings 210 and 212 have the same grating ruling linespacing, or pitch. In an alternate embodiment, these gratings have differing pitch and therefore operate in different orders for Littrow reflection to occur in each grating at the same wavelength bands.

In various alternative embodiments, optical paths of the system are folded for compactness using mirrors. In a particular embodiment, where dispersive device 214 is a reflective grating, an optical path from dispersive device 214 to array photosensor 218 has two path-folding mirrors. Further, each focusing element, 204, 226, 606, 804, may be a mirror concave in at least one axis instead of a lens. In a particular folded embodiment, camera focusing element 226 is positioned between beamsplitter 208 and dispersive element 214 instead of between dispersive element 214 and array photosensor 218, although it functions to image the interference pattern as heretofore described.

For axial rays, in the multiband spatial heterodyne spectrometer as previously described herein, the intensity I(x) at the fringe-localization plane for incident spectral density B($\sigma$) is given by:

$$I(x) = \int_0^\infty B(\sigma)\{1 + \cos[2\pi(4(\sigma - \sigma_0)x\tan(\theta_L))]\}d\sigma$$

where x is measured in the dispersion plane of the gratings. Note that, except for the constant term, I(x) is the Fourier transform of the input spectrum. The difference term in the above equation implies that for a system tuned to $\sigma_o$, adjacent spectral elements $\sigma_o \pm \delta\sigma$, $\sigma_o \pm 2\delta\sigma$, $\sigma_o \pm n\delta\sigma$ produce 1, 2, ..., n-cycle spatial frequencies across the detector. This implies that spatial frequencies a spectral distance $n\delta\sigma$ from $\sigma_o$ are indistinguishable. In some embodiments, bandpass filters block light from above or below $\sigma_o$ to disambiguate spectra.

In a standard SHS device, wavelengths from all orders that are passed by the system form interference patterns on top of each other. A bandpass filter in the system serves two uses. It rejects spectral regions so only light from a single diffraction order will enter the system. Secondly, this filter blocks light from either above or below the Littrow wavelength for the diffraction order to remove an inherent degeneracy in the interferogram. This allows the SHS to be able to acquire a meaningful interference pattern at the detector, but limits the system to working in a single diffraction order. In the MSHS, a dispersive device separates the interference pattern produced by multiple diffraction orders. Each order's fringe pattern was directed towards a different column on the focal plane array by the dispersive device. A correct choice of grating parameters ensured that the bands were separate from each other, and did not overlap.

A broadband dual-MSHS with disambiguation system provides broadband spectra without spectral data gaps. With an appropriate selection of gratings and prism, we are able to continuously measure the spectrum of a large bandwidth. We have determined that by using what amounts to two parallel MSHS systems, we can sample the spectrum with slightly overlapping diffraction orders. By measuring the spectrum with two slightly different MSHS devices, we can effectively break the degeneracy and retrieve the data from above and below the slightly-different Littrow wavelength.

In an embodiment 850 of the broad-band dual-MSHS having many duplicated optical components, (FIG. 9), a lens system 852 passes incoming light through a slit 854, and onto a dichroic beamsplitter 856. Light from mirror 856 passes directly through a first bandpass filter 858 into a first MSHS subsystem 859, and from a second mirror 860 and second bandpass filter 862 into a second MSHS subsystem 863. Bandpass filters 858 and 862 limit light entering each MSHS to prevent multiple-order aliasing, and typically have overlapping passbands. In an alternative embodiment, bandpass filters 858, 862 may have identical passbands.

Light entering the first MSHS subsystem 859 passes onto beamsplitter 864, and thence to two gratings 866, 868, dispersed light from gratings 866, 868 is combined at beamsplitter 864, producing interference fringes, and cross-dispersed by prism 870 or a third grating (not shown). This light is then imaged by an anamorphic lens 872 and imaged on a photosensor array 874. Processor 876 receives images from array 874 and processes the interference fringes into spectra.

Light entering the second MSHS subsystem 863 passes onto beamsplitter 878 and thence to two gratings 880, 882, dispersed light from gratings 880, 882 is combined at beamsplitter 878, producing interference fringes, and cross-dispersed by prism 884 or a third grating (not shown). The interference fringes of this light are then imaged by an anamorphic lens 886 and imaged on a photosensor array 888. Processor 876 receives images from array 888 and processes the interference fringes into spectra.

At least one of the gratings 880, 882, of the second MSHS subsystem 863 differs in angle or in ruling pitch from corresponding gratings 866, 868 of the first MSHS subsystem 859, and therefore the second MSHS subsystem 863 has a different Littrow wavelength from that of the first MSHS subsystem 859.

Since each MSHS subsystem produces spectra that report a difference between incoming light wavelength and its Littrow wavelength, and the Littrow wavelengths differ, processor 876 can determine whether incoming light of a particular wavelength is below both Littrow wavelengths, between the Littrow wavelengths, or above both Littrow wavelengths by examining differences in reported wavelength between the two MSHS subsystem 859, 863.

For example, if the first MSHS subsystem has a Littrow wavelength of 500 nm, the second MSHS subsystem has Littrow wavelength of 450 nm, the first MSHS subsystem reports a difference wavelength of 100 nm for monochromatic input, and the second reports a difference wavelength of 50 nm, then the incoming monochromatic light must unambiguously have a wavelength of 400 nm.

Figure 9:
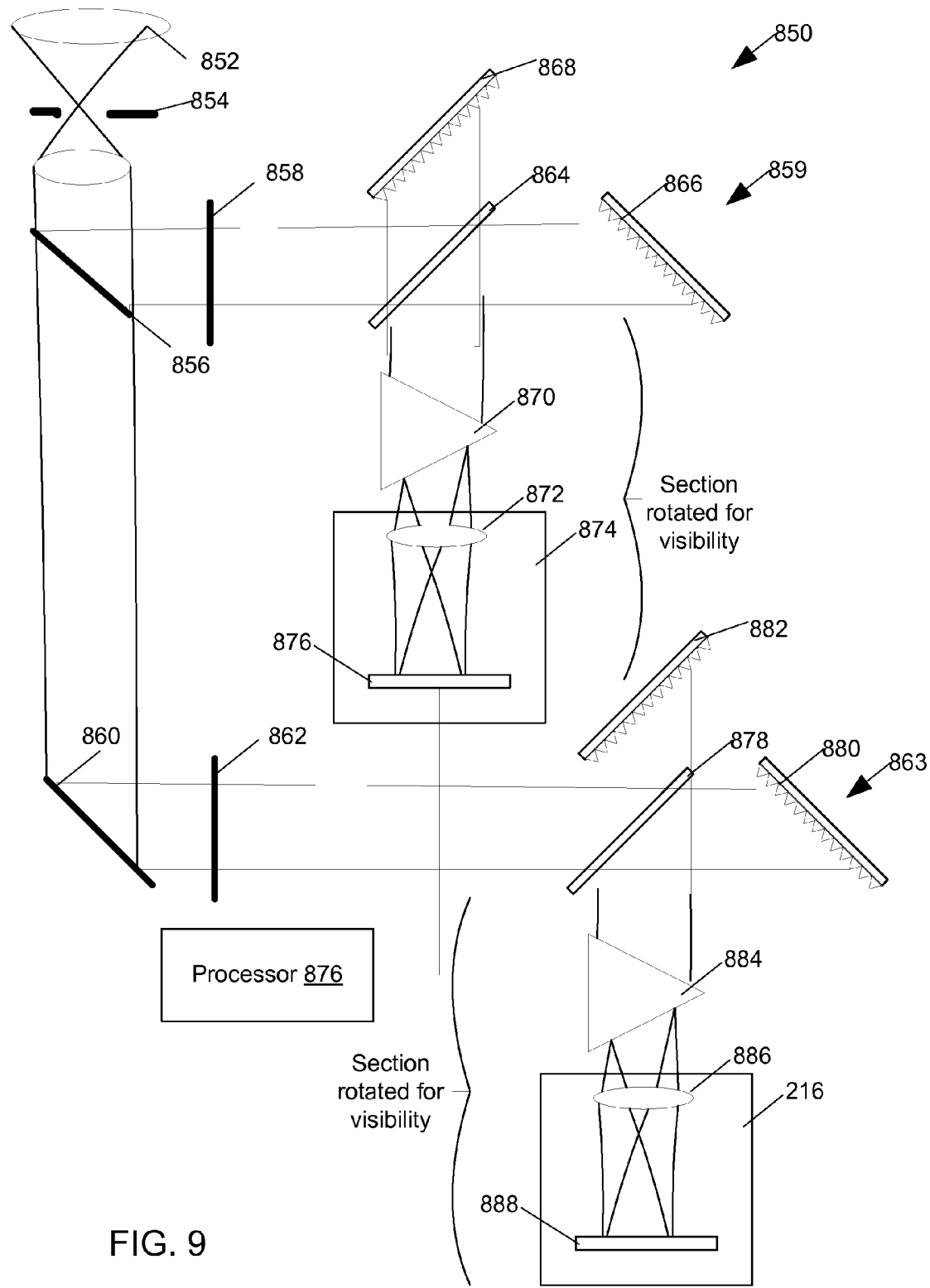
FIG. 9 illustrates a dual-path multiband spatial heterodyne spectrometer (MSHS) system having many duplicated optical components.
Figure 10:
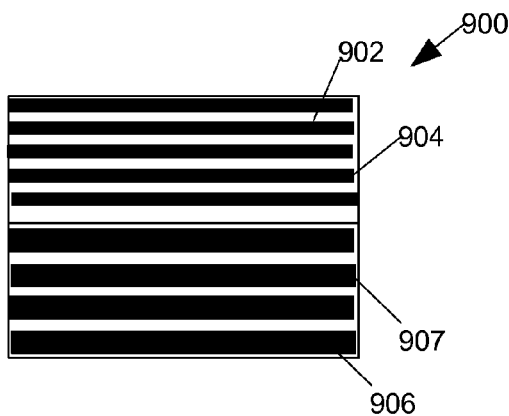
FIG. 10 illustrates a split grating having two grating line pitches, such as may be used in a dual MSHS having many shared optical components.

The system of FIG. 9 is somewhat costly because many components, including optical components, are duplicated. We have found that a dual MSHS can share most optical components if at least one diffraction grating is split. In an embodiment, a split diffraction grating 900, as illustrated in FIG. 10, has a first half 902 ruled with evenly-spaced lines 904 at a first pitch, and a second half 906 ruled with evenly-spaced lines 907 at a second pitch. A split diffraction grating having differing pitches can be fabricated using semiconductor processing techniques such as electron-beam lithography.

Figure 12:
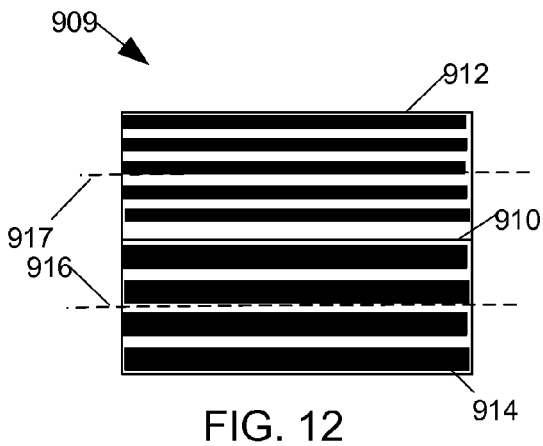
FIGS. 11 and 12 illustrate a split grating having common grating line pitch but varied grating angle such as may be used in a dual-path MSHS having many shared optical components.
Figure 11:
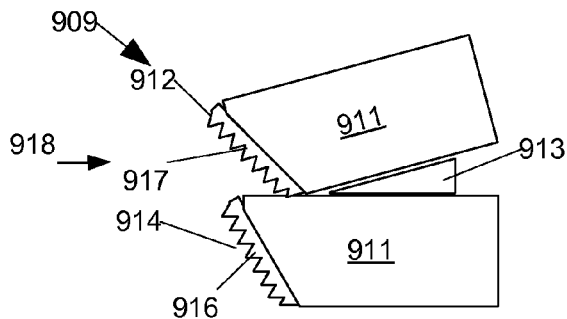

In an alternative embodiment of a split diffraction grating 909, illustrated in side view in FIG. 11 and frontal view in FIG. 12, a diffraction grating ruled with evenly spaced lines at a single pitch is split lengthwise along a dividing line 910 into a first half 912 and a second half 914, second half being rotated slightly about an axis 916, parallel to an axis 917 of the first half. Since the halves of the grating 910, 914 are rotated to be at an angle to each other, when viewed from at least one perspective 918 the grating halves will appear to have different line pitches, as show in FIG. 12.

Figure 11A:
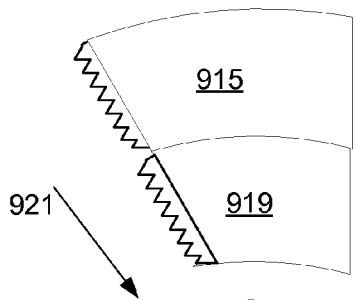
FIG. 11A and FIG. 11B illustrates an alternative split grating.
Figure 11B:
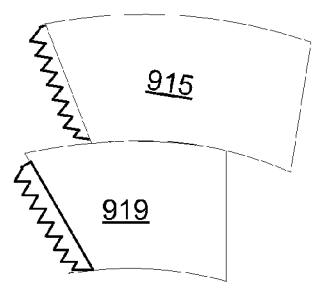

In an embodiment, gratings 912, 914, are fabricating by mounting two substrates 911 together, replicating a grating on their surface, cutting the grating, then repositioning one of the substrates and mounting that substrate in a rotated position with a wedge. In an alternative embodiment, two curved substrates 915, 919, having mating, semicylindrical, cross-section are mounted together, cut, polished, and a grating replicated on their cut surface 921 as shown in cross-section in FIG. 11A. The upper substrate 915 is then slid backwards along lower substrate 919, such that centers of gratings on upper substrate 915 align above gratings on lower substrate 919. Sliding the substrate tilts the grating on upper substrate 915 relative to that on lower substrate 919, such that angles of Littrow reflection for a particular wavelength differ between the grating on upper substrate and the grating on lower substrate.

Figure 13:
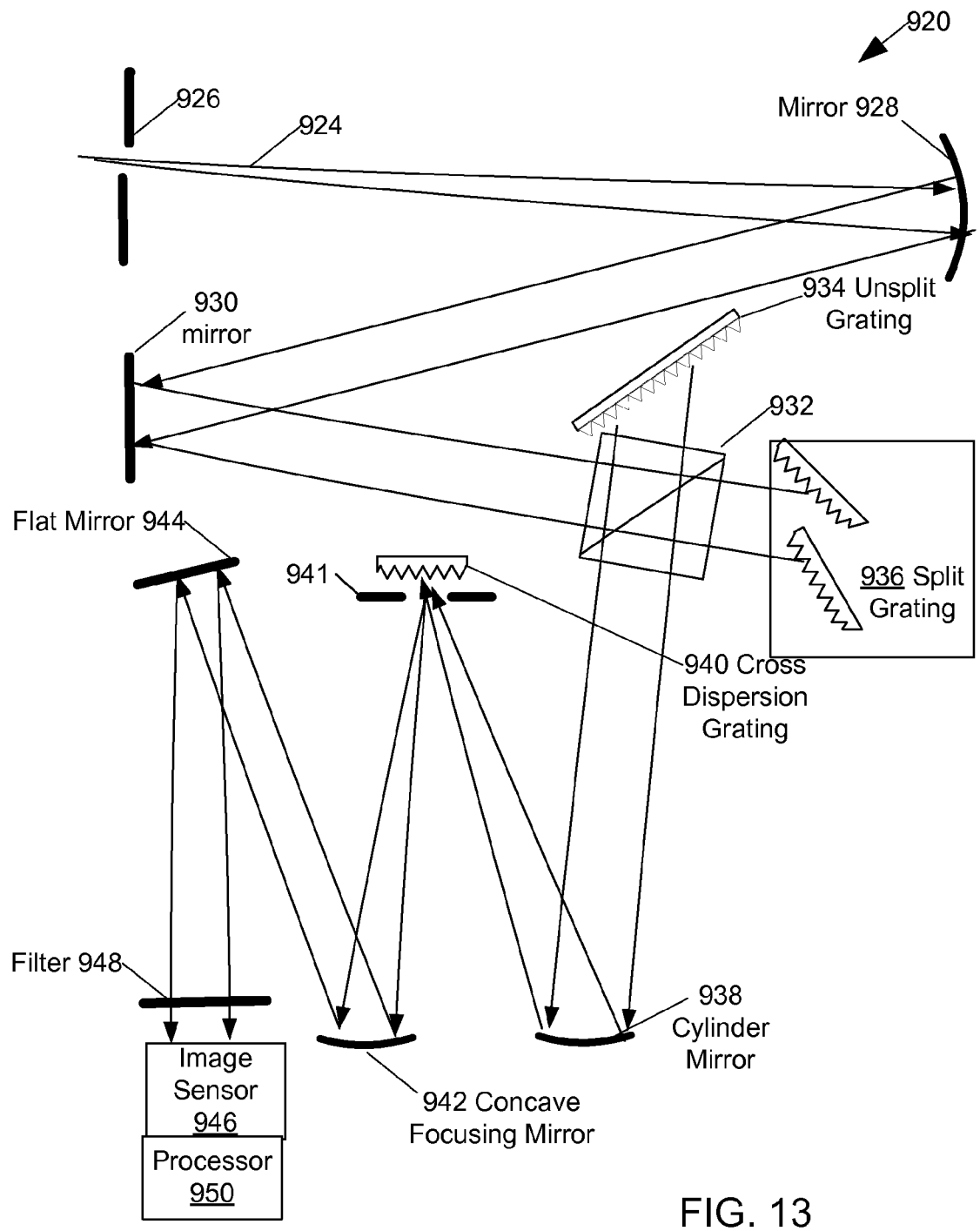
FIG. 13 illustrates a dual-path MSHS system for broadband, fully disambiguated, operation and having many shared optical components.

An embodiment 920 of the dual-MSHS system having a split grating 936 such as those discussed with reference to FIGS. 10-12, is illustrated in FIG. 13. Light 924 enters through a slit 926 and is collimated by a spherical mirror 928 along a path folded by flat mirror 930 into beamsplitter 932, and thence to an un-split grating 934 and a split grating 936, split according to the embodiments of FIG. 10 or FIGS. 11 and 12. In a particular embodiment, beamsplitter 932 is a cubical beamsplitter.

Since the effective grating angle or line pitch of each half of split grating 936 is different, the two effective spatial heterodyne spectrometers formed by half of split grating 936, beamsplitter 932, and half of un-split grating 934 have different diffraction angles, and the fringe patterns developed on the image sensor 946 from the same incoming light may therefore differ.

In a particular embodiment, approximately half of light illuminating split grating 936 arrives on each half 912, 914, 902, 906, and rays striking each half of split grating 936 are effectively kept separate on the photodetector array. This separation occurs despite the light passing through and being acted on by the same cross-dispersion grating 940, focusing mirror 942, and flat path-folding mirror 944. In an alternative embodiment, a cross-dispersion prism replaces cross-dispersion grating 940.

Figure 15:
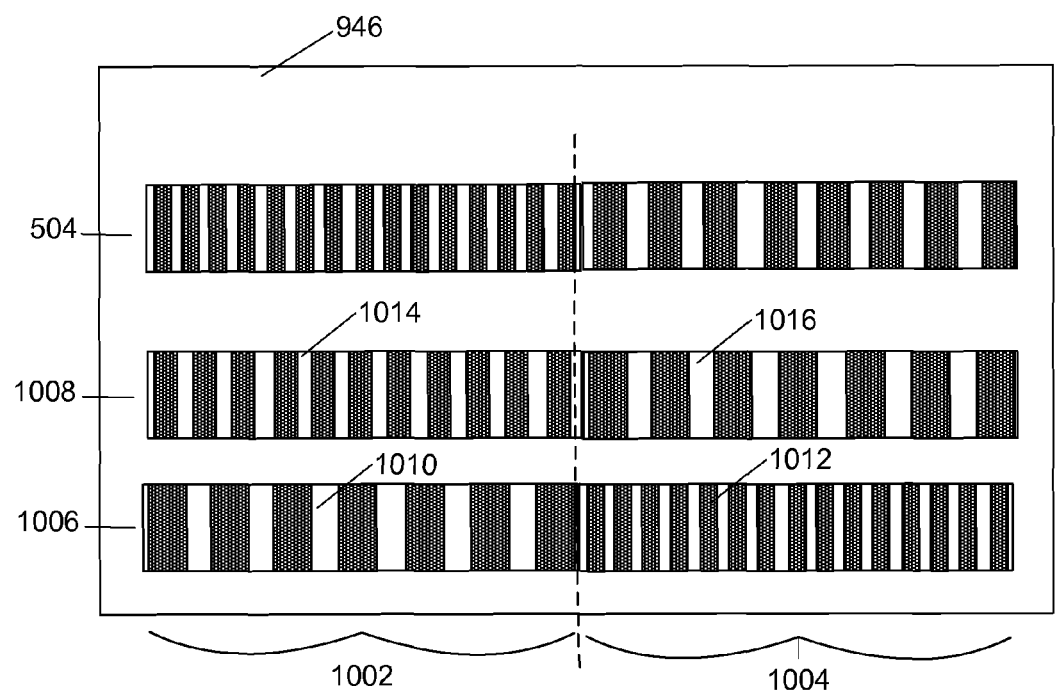
FIG. 15 illustrates a pattern on image sensor 946 of the dual-path MSHS system of FIGS. 13 and 14.

As illustrated in FIG. 15, Light from each half of split grating 936 arrives on the photodetector array at separate regions of the array, such that a first group of pixels 1002 is illuminated by light from halves 912, 902 is a different, second, group 1004 of pixels illuminated by light from halves 914, 906, and in many embodiments the first and second groups of pixels do not overlap. Cross dispersion grating 940 also separates light of different wavelengths, and hence wavelength bands, into separate rows of pixels on the image sensor, such that light of a first wavelength illuminates row 1006, and a second wavelength or wavelength band illuminates row 1008 Light of the first wavelength illuminated from first halves 912, 902 therefore illuminates a first group of pixels 1010, and from second halves 914, 906 illuminates a second group 1012 Light of the second wavelength illuminated from first halves 912, 902 therefore illuminates a third group of pixels 1014, and from second halves 914, 906 illuminates a fourth group 1016

Light from the un-split grating 934 and split grating 936 is recombined at beamsplitter 932, and then propagates to cylindrical mirror 938, cross-dispersion grating 940, and to a concave focusing mirror 942. A rectangular stop 941 is provided in front of cross dispersion grating 940. Cross dispersion grating 940 serves to disperse light by wavelength in a manner similar to that of prism 214, 802, 884, 870, in embodiments discussed previously, while concave mirror 942 serves to focus light from one plane to image the gratings on the image sensor, and collimates light in a perpendicular plane from stop 941 to form a line, in manner similar to camera lenses 222, 872, 886, 804, in previously discussed embodiments. In the embodiment of FIG. 13, however, concave mirror 942, cross dispersion grating 940, and path folding mirror 944 act on fringes associated with light from not just a single MSHS path, but from two MSHS paths, where each MSHS path corresponds to a side of split grating 936.

Fringes magnified by concave mirror 942 are reflected by a path-folding mirror 944 and projected onto, and imaged by, photosensor array 946. In an embodiment, light arrives on photosensor array from path-folding mirror 944 perpendicularly to a surface of photosensor array 946 because the focusing system, including concave mirror 942, is telecentric in both image and collimated axes. A bandpass filter 948 may be provided at any point in the optical path from before the slit to the photosensor array to exclude light at wavelengths that may cause diffraction-order ambiguities or are outside a range of interest. A processor 950 is provided to process the imaged interference fringes to determine spectra of the incoming light 924 by performing Fourier transformations to decompose the fringes in frequency.

In an alternative embodiment, the focusing effects of concave mirror 942 and cylindrical mirror 938 are performed by an anamorphic lens, or a combination of cylindrical and spherical lenses.

Figure 14:
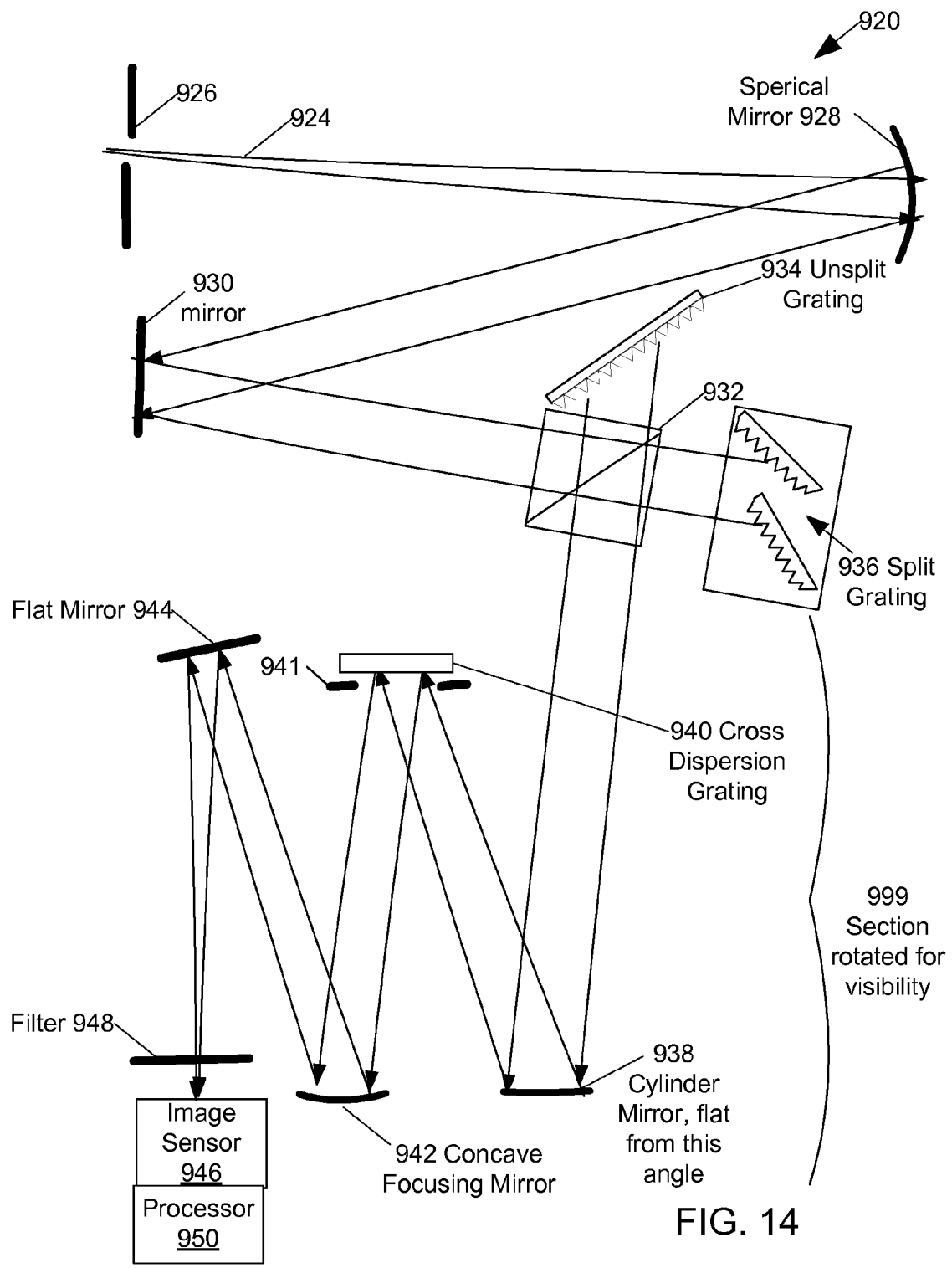
FIG. 14 illustrates the dual MSHS system of FIG. 13 with certain optical paths rotated for visibility.

FIG. 14 illustrates light paths of FIG. 13 with a section 999 rotated ninety degrees for visibility.

The embodiments of FIGS. 9 and 13-14 essentially use spatial separation between fringes, halves of the split diffraction grating 936, to separately illuminate groups of pixel sensors on photosensor array 946.

Figure 16:
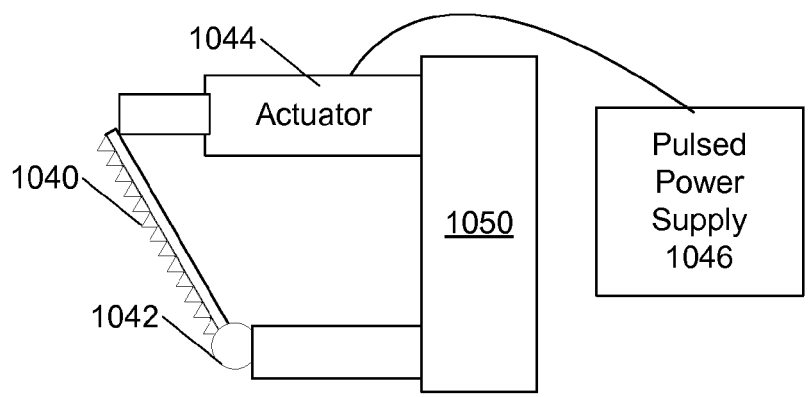
FIG. 16 illustrates a grating that alternates between a first and a second angle.

A temporal separation between two or more MSHS modes is also possible. A diffraction grating 1040 (FIG. 16) is mounted with a pivot 1042 on one end and an actuator 1044 on another end. Actuator 1044 is an electro-mechanical actuator, such as a voice-coil, solenoid, or piezoelectric actuator that adjusts an angle of grating 1040 under control of a repetitively variable power supply 1046 by changing actuator length between a first and a second length according to signals from supply 1046. Actuator 1044 and pivot 1042 are mounted to a support 1050. An MSHS system resembling that of FIG. 13 is configured with actuator 1044 and grating 1040 replacing split grating 936 such that a single MSHS system alternates between a first grating angle and a second grating angle. The image sensor 946 receives a single set of fringes, resembling those discussed with reference to FIG. 5, at any one time; however the fringes alternate between a pair of fringe pattern produced with grating 1040 at the first and second grating angles. In this embodiment, the processor 950 captures a set of fringes at the first grating angle, and a second set of fringes at the second grating angle, then processes these fringes to produce disambiguated spectra.

Figure 17:
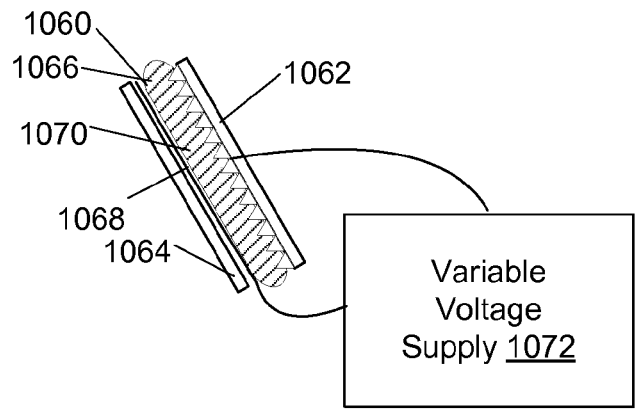
FIG. 17 illustrates a grating coated with liquid crystals such that an effective Littrow wavelength varies with applied voltage.

Liquid crystals are known that change refractive index from a first refractive index to a second refractive index when a voltage is applied. Since the order of reflection of incident light striking a diffraction grating is a function of the refractive index of the medium through which the incident light propagates, applying a voltage alters Littrow reflection. In an alternative embodiment of a temporally separated dual MSHS system, a diffraction grating 1060 (FIG. 17) is prepared on an electrically conductive substrate 1062. A transparent cover 1064 is spaced in front of the diffraction grating 1060. A transparent electrode 1068, fabricated from a transparent electrical conductor such as indium tin oxide, is formed on a side of cover 1066 nearest grating 1060. A liquid crystal that alters refractive index when a voltage is applied is placed in the space 1070 between cover 1064 and electrode 1068 and grating 1060. A variable power supply 1072, operable under control of processor 950 (FIG. 13), is coupled to provide signals to the conductive substrate 1062 and transparent electrode 1068, the signals for switching the liquid crystal between a first index of refraction and a second index of refraction. Grating 1060 then replaces split grating 936 in an MSHS otherwise resembling that of FIG. 13. In this embodiment, the grating 1060 that replaces split grating 936 is alternated between first and second modes as the power supply biases the liquid crystal to the first index of refraction and the second index of refraction. In the first mode, the processor captures a first set of fringes, and then captures a second set of fringes when the power supply switches modes by biasing the liquid crystal to the second mode and switching the index of refraction of the liquid crystal. Processor 950 then processes these fringes to produce disambiguated spectra.

In an alternative embodiment, processor 950 configures the power supply to alternate the actuator between a first pair of actuator lengths for operation of the system at a first wavelength range, and configures the power supply to alternate between a second pair of actuator lengths for operation of the system in a second wavelength range; the processor can therefore use the actuator to tune the system for operation at a particular wavelength range.

In yet another alternative embodiment, at least one of the first and second gratings is printed on an elastic material to form an elastic diffraction grating that serves as a temporally-split grating 936. In this embodiment, the elastic diffraction grating is mounted at a fixed angle, with an actuator configured to tension and stretch the grating under control of a variable power supply and thereby alternate grating pitch between two or more pitches, where each pitch is a separate mode of operating the grating. In this embodiment, the first mode of the grating corresponds to the grating operated at a first tension pitch, and the second mode of the grating corresponds to the grating operated at a second tension and pitch. The processor configures the power supply to operate the elastic grating in a first mode at a first pitch, records a first set of fringes, then reconfigure the grating to operate in a second mode at a second pitch, records a second set of fringes and processes the first and second sets of fringes to provide disambiguated spectra of incoming light.

In yet another alternative embodiment, a voltage-variable prism, or similar device, is placed in front of at least one of the first and second gratings to shift an angle of light incident on that grating and form an equivalent of a voltage-variable grating. In this embodiment, the diffraction grating is mounted at a fixed angle with the voltage-variable prism ahead of it as split grating 936, and is under control of a variable power supply that alternates effective grating angle between two or more pitches, where each angle is a separate mode of operating the grating. In this embodiment, the first mode of the grating corresponds to the grating operated with the prism at a first voltage and the grating at a first effective angle, and the second mode of the grating corresponds to the prism at a second voltage and the grating operated at a second effective angle. The processor configures the power supply to operate the temporally-split grating in a first mode at a first effective angle, records a first set of fringes, then configures the grating to operate in a second mode at a second effective angle, records a second set of fringes and processes the first and second sets of fringes to provide disambiguated spectra of incoming light.

In yet another embodiment of a temporally-separated dual MSHS system, a temporally-split grating is formed as a first and a second half-grating, and provided with a mechanical actuation device that positions the first and second half-gratings alternately in the optical path as split grating 936. In a particular embodiment, the mechanical actuation device is formed from a disk having the first and second half-gratings mounted on it, the disk in turn mounted to an electric motor such as a rotary stepping motor. In this particular embodiment the processor controls the motor to position the first half-grating in the optical path in a first mode, records a first set of fringes, then configures the temporally-split grating to operate in a second mode by rotating the second half-grating into the optical path, records a second set of fringes and processes the first and second sets of fringes to provide disambiguated spectra of incoming light.

In yet another alternative embodiment, of a temporally-separated dual MSHS system, a temporally-split grating is formed from a fixed grating with a first and a second prism, and provided with a mechanical actuation device that positions the first and second prisms alternately in the optical path, the combination of prism and grating functioning as split grating 936. In a particular embodiment, the mechanical actuation device is formed from a disk having the first and second prisms mounted on it, the disk in turn mounted to an electric motor such as a rotary stepping motor. In this particular embodiment the processor controls the motor to position the first prism in the optical path in a first mode, records a first set of fringes, then configures the temporally-split grating to operate in a second mode by rotating the second prism into the optical path, records a second set of fringes and processes the first and second sets of fringes to provide disambiguated spectra of incoming light.

Figure 18:
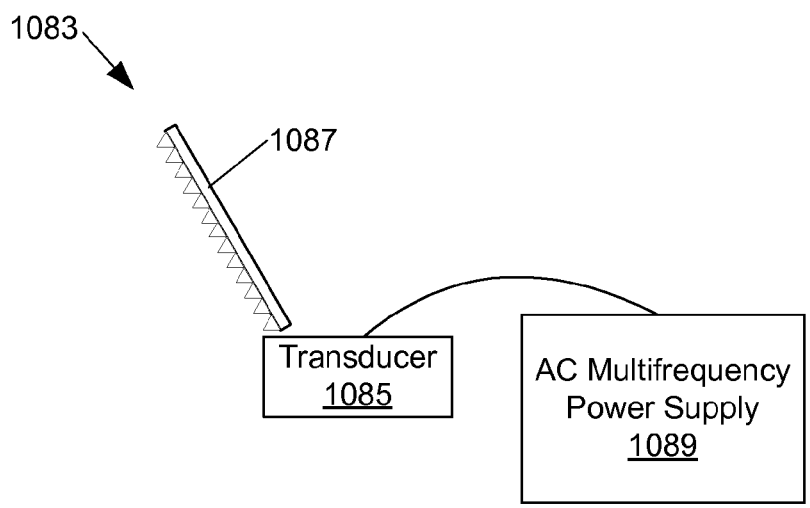
FIG. 18 illustrates a grating formed from a variable-frequency power supply and an acousto-optic device where effective Littrow angle varies with a frequency of the power supply.

In yet another alternative embodiment, of a temporally-separated dual MSHS system, a temporally-split grating is formed, as illustrated in FIG. 18, from an acoustooptic device 1083 having an acoustooptic material 1087 coupled to a piezoelectric transducer 1085 for inducing soundwaves in the acoustooptic device. In this embodiment, a grating pitch of the acoustooptic device is determined by a frequency of the soundwaves in the acoustooptic device, and thus by a frequency of an AC voltage applied to the piezoelectric transducer of the device. The acoustooptic device is provided with an alternating-current power supply 1089 capable of applying a first and a second frequency of AC voltage alternately to the piezoelectric transducer. The acoustooptic device is positioned in the optical path as split grating 936, and the power supply 1089 is coupled to the processor 950. In a particular embodiment, the processor controls the power supply to provide AC voltage to the piezoelectric transducer at a first frequency, and thus configure the acoustooptic device as a diffraction grating with a first pitch in a first mode, records a first set of fringes, then configures the temporally-split grating to operate in a second mode by changing the frequency provided by the power supply to the transducer, records a second set of fringes and processes the first and second sets of fringes to provide disambiguated spectra of incoming light.

While the optical paths illustrated may in some embodiments be shown as straight, and in others as folded with folding mirrors, such optical paths of any embodiment may be straight when space is available, or folded for compactness, as may be convenient.

The MSHS is adaptable for operation in the infrared, visible, or ultraviolet regions of the electromagnetic radiation spectrum. In particular, the first and second wavelength bands may be in the same or different regions of electromagnetic radiation—in one embodiment visible and infrared bands are used, in another visible and ultraviolet, in yet another two bands in visible are used. In another embodiment, multiple bands in each of two or more regions of electromagnetic radiation spectrum are used.

The changes described above, and others, may be made in the multiband spatial heterodyne spectrometer described herein without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A dual-path spatial heterodyne spectrometer for determining spectra of incident light comprising:
   a beam splitter configured to split incident light and to direct the incident light upon a first and a second diffraction grating, wherein the first diffraction grating has a first half configured for Littrow reflection of incident light at a first wavelength at a first order at a first angle, and a second half configured for Littrow reflection of incident light at the first wavelength at the first order at a second angle, wherein the second diffraction grating is configured for Littrow reflection of light of the first wavelength, and wherein light reflected by the first and the second diffraction grating forms interference patterns;
   an electronic camera for detecting the interference patterns, the camera comprising a detector having at least a first and a second group of pixel sensors; and
   a processing device coupled to receive information from the detector and to compute spectra therefrom.

2. The dual-path spatial heterodyne spectrometer of claim 1 wherein light at the first wavelength and reflected by the first half of the first diffraction grating is detected by the first group of pixel sensors, and light reflected by the second half of the first diffraction grating is detected by the second group of pixel sensors.

3. The dual-path spatial heterodyne spectrometer of claim 2 wherein at least one singular image-forming device of the electronic camera selected from a lens and a mirror serves to image interference patterns formed by light from second diffraction grating and both the first and second halves of the first diffraction grating.

4. A dual-path multiband spatial heterodyne spectrometer comprising the dual-path spatial heterodyne spectrometer of claim 2 and further comprising a cross-dispersive device selected from the group consisting of a prism and a diffraction grating, the cross-dispersive device positioned such that light of the first wavelength and corresponding to interference fringes generated by the first half of the first diffraction grating is imaged on the first group of pixel sensors, and light of a second wavelength and corresponding to interference fringes generated by the first half of the first diffraction grating is imaged on a third group of pixel sensors of the electronic camera.

5. The dual-path multiband spatial heterodyne spectrometer for determining spectra of claim 4 wherein the dispersive device is a prism.

6. The dual-path multiband spatial heterodyne spectrometer of claim 4 wherein the dispersive device is a diffraction grating.

7. The dual-path multiband spatial heterodyne spectrometer of claim 4 wherein the first order is in the range 10 to 400.

8. The dual-path multiband spatial heterodyne spectrometer of claim 4 wherein the first half of the first diffraction grating has lines ruled with a different pitch than lines of the second half of the first diffraction grating.

9. The dual-path multiband spatial heterodyne spectrometer of claim 4 wherein the first half of the first diffraction grating is positioned at an angle with respect to the second half of the first diffraction grating.

10. The dual-path multiband spatial heterodyne spectrometer of claim 4 wherein a lens selected between an anamorphic lens and a compound lens comprising a cylindrical lens and a spherical lens, images an opening selected from the group consisting of a slit and an aperture in a first axis, and a diffraction grating in a second axis.

11. The dual-path multiband spatial heterodyne spectrometer of claim 4 wherein light of the first wavelength is diffracted for Littrow reflection in an order by the first diffraction grating, and light of the second wavelength is diffracted for Littrow reflection by the first diffraction grating in an order different from the order of diffraction of the first wavelength.

12. The dual-path spatial heterodyne spectrometer of claim 2 wherein the first half of the first diffraction grating has lines ruled with a different pitch than lines of the second half of the first diffraction grating.

13. The dual-path spatial heterodyne spectrometer of claim 2 wherein the first half of the first diffraction grating is positioned at an angle with respect to the second half of the first diffraction grating.

14. The dual-path spatial heterodyne spectrometer of claim 2 further comprising a linear variable filter disposed before the detector to block light of a second wavelength from the first and second groups of pixel sensors, while allowing light of the first wavelength to reach the first and second groups of pixel sensors, and blocking light of the first wavelength from a third group of pixel sensors of the electronic camera while allowing light of the second wavelength to reach the third group of pixel sensors.

* * * * *